(12) United States Patent
Kawahara

(10) Patent No.: US 6,522,664 B1
(45) Date of Patent: Feb. 18, 2003

(54) COMMUNICATION PLATFORM LSI SYSTEM

(75) Inventor: Nobuo Kawahara, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/267,647

(22) Filed: Mar. 15, 1999

(30) Foreign Application Priority Data

Apr. 16, 1998 (JP) .......................................... 10-106511
Sep. 17, 1998 (JP) .......................................... 10-263157

(51) Int. Cl.⁷ ................................................ H04J 3/22
(52) U.S. Cl. ...................................... 370/466; 370/467
(58) Field of Search ................................ 370/464, 465, 370/466, 467, 290, 300, 357, 386, 395.5, 400, 422

(56) References Cited

U.S. PATENT DOCUMENTS 5,208,811 A * 5/1993 Kashio et al. ............... 370/94.1
5,774,695 A * 6/1998 Autrey et al. ................ 395/500
6,111,893 A * 8/2000 Volftsun et al. ............. 370/466
6,128,315 A * 10/2000 Takeuchi .................... 370/466

FOREIGN PATENT DOCUMENTS

JP        7-30981        1/1995

* cited by examiner

Primary Examiner—Hassan Kizou
Assistant Examiner—Anh-Vu H Ly
(74) Attorney, Agent, or Firm—Finnegan, Henderson, Farabow, Garrett & Dunner, L.L.P.

(57) ABSTRACT

The present invention provides a communication LSI for easily realizing mutually sending and receiving control system data and information system data by incorporating a control system I/O interface used when executing sensor monitoring and actuator drive control, an information system communication interface of Ethernet or others, and a data conversion CPU on one chip. Specifically, when sending control system data from a sensor connected to the control system I/O interface 107 to the Ethernet 106, the control system data stored in the memory 102 is converted to an Ethernet protocol by the CPU 101 and stored in the memory 102. The data converted to the Ethernet protocol is then sent to the Ethernet 106 from the information system controller 105 via the bus controller 104. On the other hand, when sending information system data to the sensor from the Ethernet 106, the reverse procedure of the aforementioned procedure is performed.

2 Claims, 9 Drawing Sheets

COMMUNICATION PLATFORM LSI SYSTEM

BACKGROUND OF THE INVENTION

The present invention relates to a communication platform LSI for converting general information data, transmitted through a general purpose information system network such as a communication network based on Ethernet or ISDN (integrated services digital network) into control data such as data from a sensor or an actuator transmitted through a dedicated control system network for centrally controlling facilities in scattered buildings at a distant place, or vice versa and for executing communication between those different kind of data.

The present invention also relates to a communication platform LSI used in the above system, and a communication control. method in the above system.

Conventionally, exchanging (communicating or negotiating) of information data from Ethernet, ISDN, or IrDA (infrared data association) with control data from digital I/O or counter I/O used for sensor monitoring has not been considered so much. Conventionally, in order to exchange the control data with the information data on a high-speed communication protocol of Ethernet or ISDN, control data is once converted to a protocol for a distributed control system network such as a LON (local operating network) or a protocol for an ISA bus and then it is converted to an information system communication protocol such as TCP/IP or Ethernet again. As stated above, direct exchange between the control data such as those used for executing sensor monitoring or actuator drive controlling with the information data based on high-speed communication protocol of Ethernet or ISDN is not considered so much. As a result, the exchange has been realized by converting the protocol several times and a problem arises that the system for that purpose becomes complex and large in scale.

Furthermore, by connecting an information system network represented by Ethernet or ISDN with a control system network represented by LON, the control system network limited to a small area can be extended to a large scale network as a whole. In such a system, for example, to constitute a device for connecting between networks, a plurality of different communication LSIs are used depending on the kind of each network or separate LSIs are used so as to control the device from each control network are used.

For example, with recent development of the communication art, various type of networks are formed and operated. Among them, there is a control system network. This control system network is applied to, for example, a building management system and a plant management system. As shown in FIG. 1, this control system network is installed to exchange control data between control nodes 20 and a control device 10 for centrally managing the control nodes 20. Control nodes 20 is provided for executing monitoring and drive controlling of a sensor 30 and actuators (an illumination 31, a switch 32, a motor 33, a braker 34, and an alarm 35).

This control system network 1 has a sole function of sending and receiving control data between the control nodes 20 and the control device 10. A dedicated communication protocol is, therefore, used which is suited to the control system network 1, such as Lon Talk developed by Echelon Corporation in USA. Each control node 20 used in the control system network 1 using this Lon Talk is a one-chip electronic circuit. In the circuit, a CPU 21, a memory 22, a control input/output port 24, and a LON controller 25 are connected via a bus 23 as shown in FIG. 2. When control data sent on a LON network (a network for sending and receiving data by Lon Talk), a control system network, is supplied to the circuit via a LON controller (a communication controller for connecting to the LON network) 25, the CPU 21 refers to the program which is stored in the memory 22 and whose execution is controlled by CPU 21, and generates a control signal for controlling the drive of various actuators corresponding to the control data. The circuit also outputs the control signal via the control input/output port 24 when detection signals from various sensors are supplied via the control input/output port 24, the CPU 21 refers to the program which is stored in the memory 22 and whose execution is controlled by CPU 21, and generates control data indicating the detection contents. The circuit sends it to the LON network via the LON controller 25. Namely, with this control system network 1, a centralized management system can be easily constructed only by describing (programming) the function to be executed by each control node 20. The control system network is, therefore, rapidly spreading recently.

As mentioned above, conventionally, it is not considered so much to send and receive data of the information system of Ethernet, ISDN, or IrDA and data of the control system of digital I/O or counter I/O used for sensor monitoring. Directly sending or receiving control data used when executing sensor monitoring or actuator drive control with an information system high-speed communication protocol of Ethernet or ISDN is not considered so much. As a result, the aforementioned sending and receiving are realized by converting the protocol several times and a problem arises that the system for that purpose becomes complex and large in scale. Furthermore, since the system is connected to a plurality of kinds of networks, when a special LSI is developed for each network, many kinds of LSIs are necessary, and the development efficiency gets worse, and the mass production effect cannot be expected, and an increase in cost is caused.

As indicated in Japanese Patent Application Laid-Open 7-30981 which is a Japanese application patent, there is a system having a means for constructing a network memory on an information system LAN and writing data required by the information system in the network memory on the information system LAN by using data in a network memory on a control system LAN. However, this patent application neither discloses nor suggests any concrete idea of resolving the above problems.

In the aforementioned control system network, it is supposed to send and receive control data via a communication controller only for the control system network such as the LON controller 25 shown in FIG. 2. It means that the control system network is independent of other general purpose networks (information system networks). On the other hand, there is a recently increasing need for constructing a large scale network including control system networks such as a request for constructing a large scale centralized management system by connecting a plurality of control system networks such as mentioned above. Generally, when constructing a large scale network by connecting a plurality of networks, a computer for controlling those networks is necessary. In the world of information system network, there are standard protocols including Ethernet, so that to execute efficient network control by a computer, it is desirable to use a standard protocol such as Ethernet.

However, as mentioned above, a control system network using a dedicated communication protocol such as Lon Talk is independent of other general purpose networks because a centralized management system can be easily constructed and is not a network for which mutual connection with other networks is taken into account. A problem, therefore, arises that it is difficult to construct a large scale network including control system networks. Furthermore, when developing gateway LSIs for connecting these control system networks to information system networks, it is forced to develop a plurality of kinds of LSIs according to the protocols of information system networks on the remote side. Thus a problem arises that the development efficiency is low and the mass production effect cannot be expected.

BRIEF SUMMARY OF THE INVENTION

An object of the present invention is to eliminate the aforementioned failures.

Another object of the present invention is to provide a communication platform LSI system for easily realizing mutual exchange (communication/negotiation) of control system data and information system data. The object is fulfilled by mounting a control system I/O interface for executing sensor monitoring and actuator drive control, an information system communication interface of Ethernet or others, and a data conversion CPU on one chip.

Yet another object of the present invention is to provide a communication platform LSI used in the system, and a control method for communication in the system.

The communication platform LSI of the present invention is a communication platform LSI for executing communication by converting information system data from a communication network of Ethernet or ISDN and control system data of a LON network which is an autonomous distributed control network or of digital I/O or counter I/O used for sensor monitoring to data which can be mutually exchanged, which includes a storage means for storing the information system data and control system data, an information system data communication control means for controlling sending and receiving of data to and from the communication network, a control system data interface means for controlling sending and receiving of data to and from the sensor, and a conversion means for reading and writing data sent and received by the information system data communication control means and by the control system data interface means from and into the storage means and converting the protocol of the data to a protocol suited to the protocol of the sending destination, wherein when sending the information system data received from the communication network to the sensor, the protocol conversion means stores the information system data received by the information system data communication control means in the storage means, converts the protocol of the stored information system data to data capable of controlling the sensor, and stores it in the storage means, and the control system data interface means sends the protocol-converted data in the storage means to the sensor, and wherein when sending the control system data received from the sensor to the communication network, the protocol conversion means stores the control system data received by the control system data interface means in the storage means, converts the protocol of the stored control system data to a protocol suited to the communication network, and stores it in the storage means, and the information system data communication control means sends the protocol-converted data in the storage means to the communication network.

According to the present invention described above, mutual communication by control system data from a sensor or actuator and by information system data from a communication network based on Ethernet or ISDN can be simply realized. To correspond to a plurality of sensors, a plurality of aforementioned control system data interface means may be installed in correspondence to each sensor. A plurality of aforementioned information system data communication control means may be installed so as to correspond to a plurality of communication protocols.

Furthermore, for example, speaking of a factory including a communication platform LSI according to the present invention, when a plurality of blocks (each block corresponds to one line or one building) are installed and the blocks are controlled by a computer via the aforementioned communication network, data supplied from the blocks can be centrally managed by gathering them. Thus the system in which each block is installed can be made smaller and showing another system example using the communication platform LSI of the second embodiment.

DETAILED DESCRIPTION OF THE PREFERRED EMBODIMENTS

The embodiments of the present invention will be explained hereunder with reference to the accompanying drawings.

First Embodiment

Figure 1:
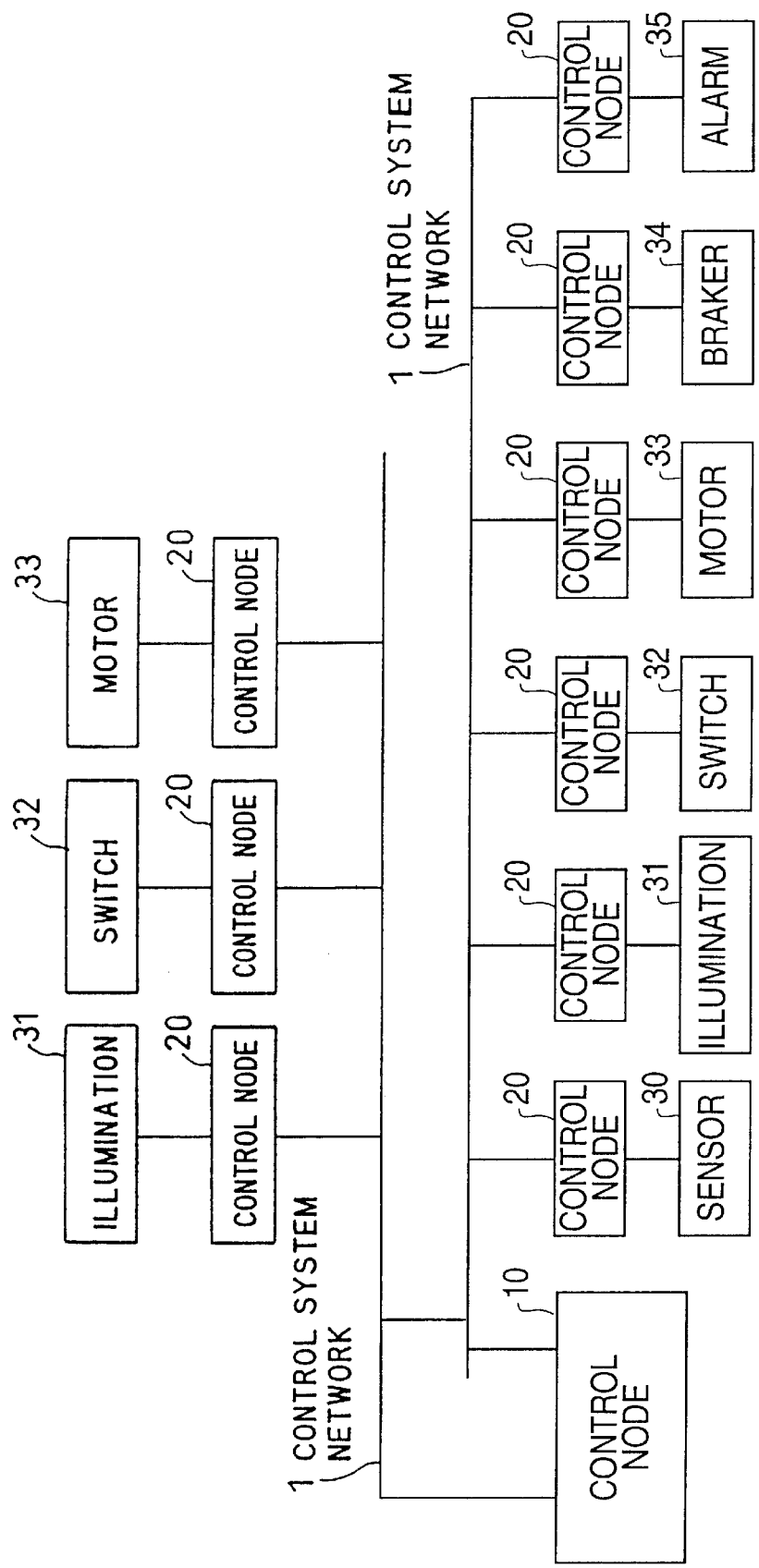
FIG. 1 is a block diagram of a control system network.
Figure 2:
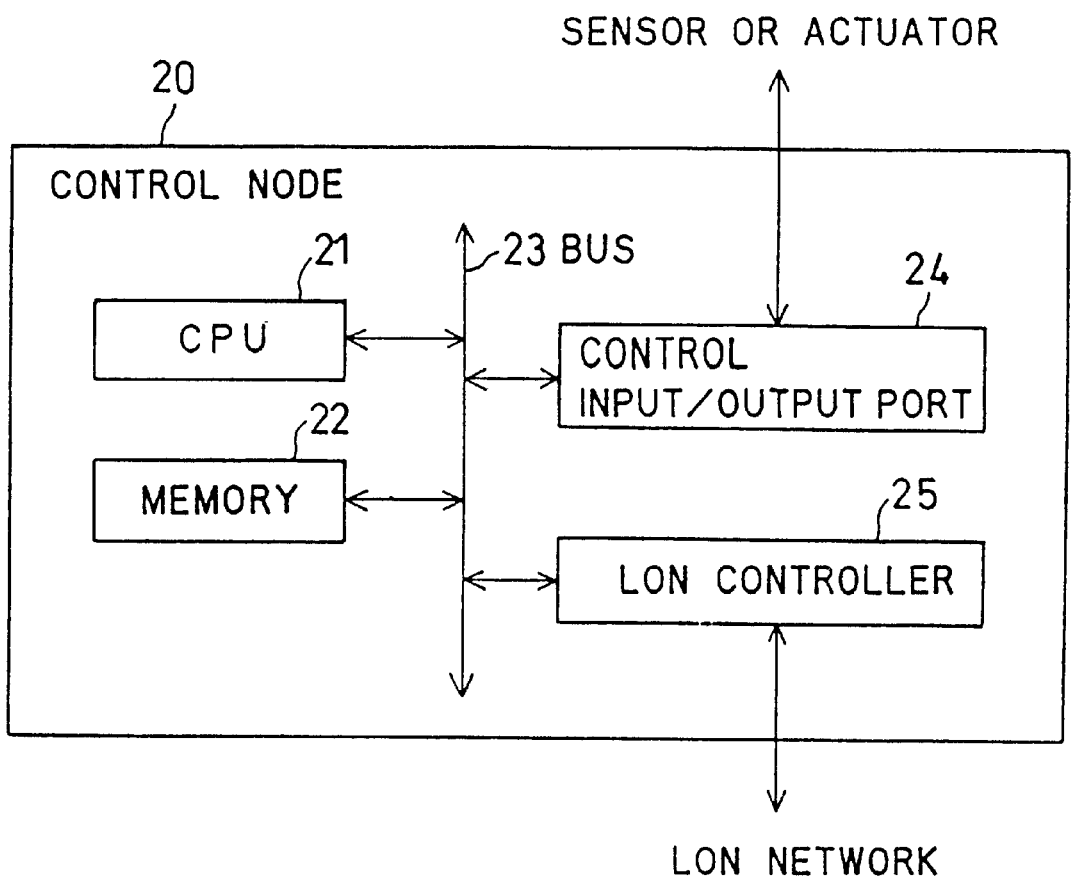
FIG. 2 illustrates a control node.
Figure 3:
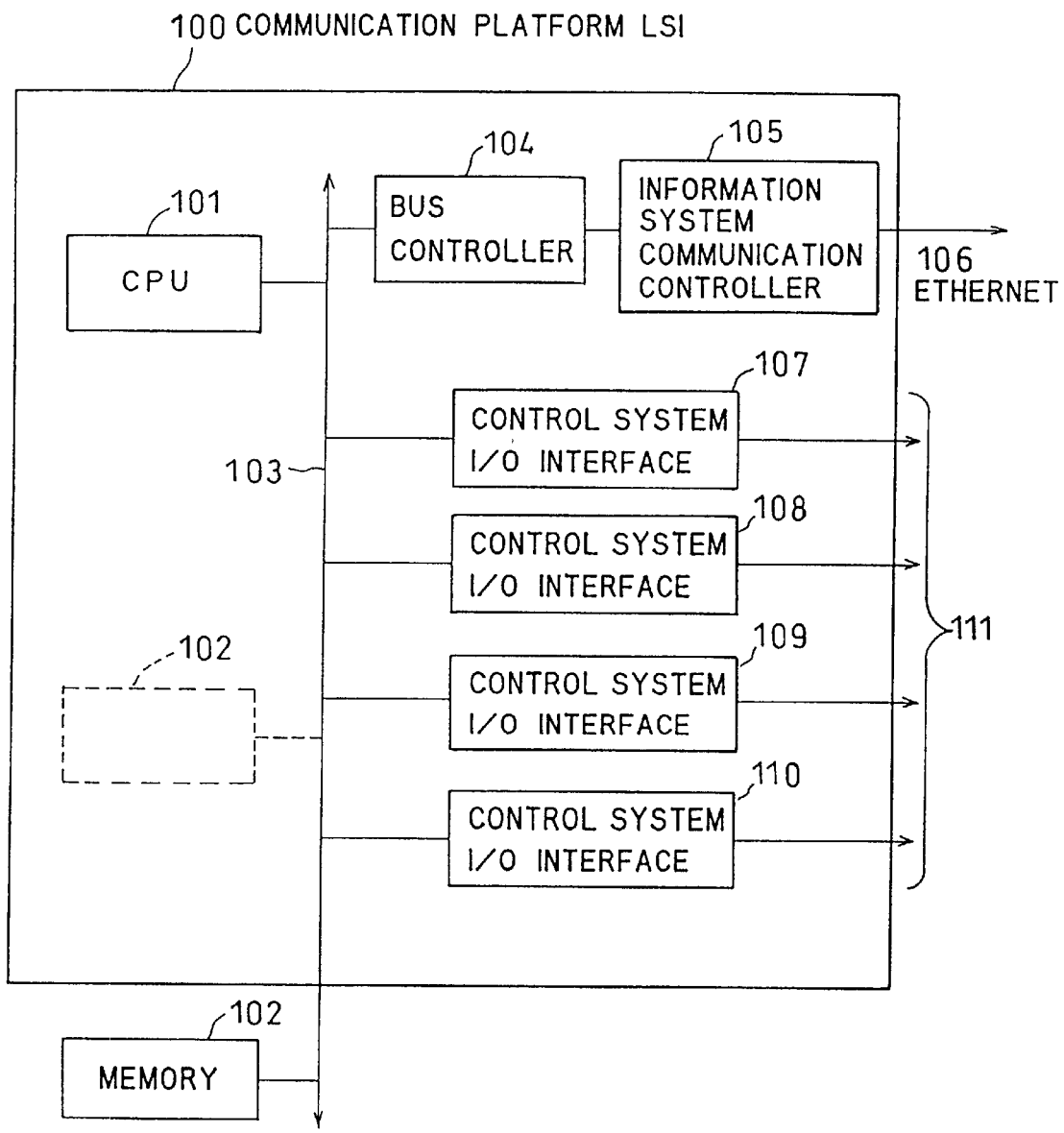
FIG. 3 is a block diagram of a communication platform LSI, in accordance with methods and systems provided.

FIG. 3 is a block diagram showing the communication platform LSI of the first embodiment of the present invention. The communication platform LSI 100 is an electronic circuit which is applied to a gateway for connecting a control system network using a dedicated communication protocol such as Lon Talk and an information system network using a standard protocol such as Ethernet. Thee communication platform LSI 100 is a one-chip electronic circuit in which a CPU 101, an information system controller 105, control system I/O interfaces 107, 108, 109, and 110 of a LON controller (a communication controller for connecting to a LON controller) are connected via a CPU bus 103, information system controller 105 is provided for connecting the CPU bus 103 to an information system network using a standard protocol such as an Ethernet network via a bus controller 104. The control system I/O interfaces 107, 108, 109, and 110 of a LON controller is provided for connecting to the CPU bus 103, for example, a LON network (a network sending and receiving data by Lon Talk) which is a control network are connected.

The CPU 101 controls each communication controller and control system interface. The CPU 101 connects the bus controller 104, and the control system I/O interfaces 107, 108, 109, and 110 via the CPU bus 103.

A memory 102 is connected to the CPU 101 via the CPU bus 103. The memory 102 stores the communication processing program information to be executed by the CPU 101 and communication data. In this embodiment, the memory 102 is installed outside the communication platform LSI 100. However, needless to say, it may be installed inside the communication platform LSI 100.

The bus controller 104 controls access to the CPU bus 103 by the information system communication controller 105. The information system communication controller 105 executes network control of Ethernet 106, connection control to ISDN, IrDA interface control, and modem control. In this case, Ethernet 106 indicates a communication network such as a LAN (local area network) based on Ethernet.

The control system I/O interfaces 107, 108, 109, and 110 includes a digital input/output interface, a parallel input/output interface, a total counter input interface, a pulse count input/output interface, a quadrature counter input interface, a trigger count output interface, a gate control counter input interface, a pulse width output interface, an SPI bus interface, and an asynchronous serial interface respectively. Control system data signal lines 111 to which the control system I/O interfaces 107, 108, 109, and 110 are connected are monitoring data from a sensor and a drive control signal of an actuator both of which are not shown in the drawing.

The data transfer processing operation of the embodiment described above will be explained. The control system signals 111 are connected to various sensors and actuators not shown in the drawing. Information from the sensors are sent to the CPU 101 via the control system I/O interfaces 107, 108, 109, and 110 and are processed there. Control data from the CPU 101 is supplied to the control system data signal lines 111 via the control system I/O interfaces 107, 108, 109, and 110 and is used for drive control of the actuators. On the other hand, the information system communication controller 105 is connected to the CPU bus 103 via the bus controller 104.

Figure 4:
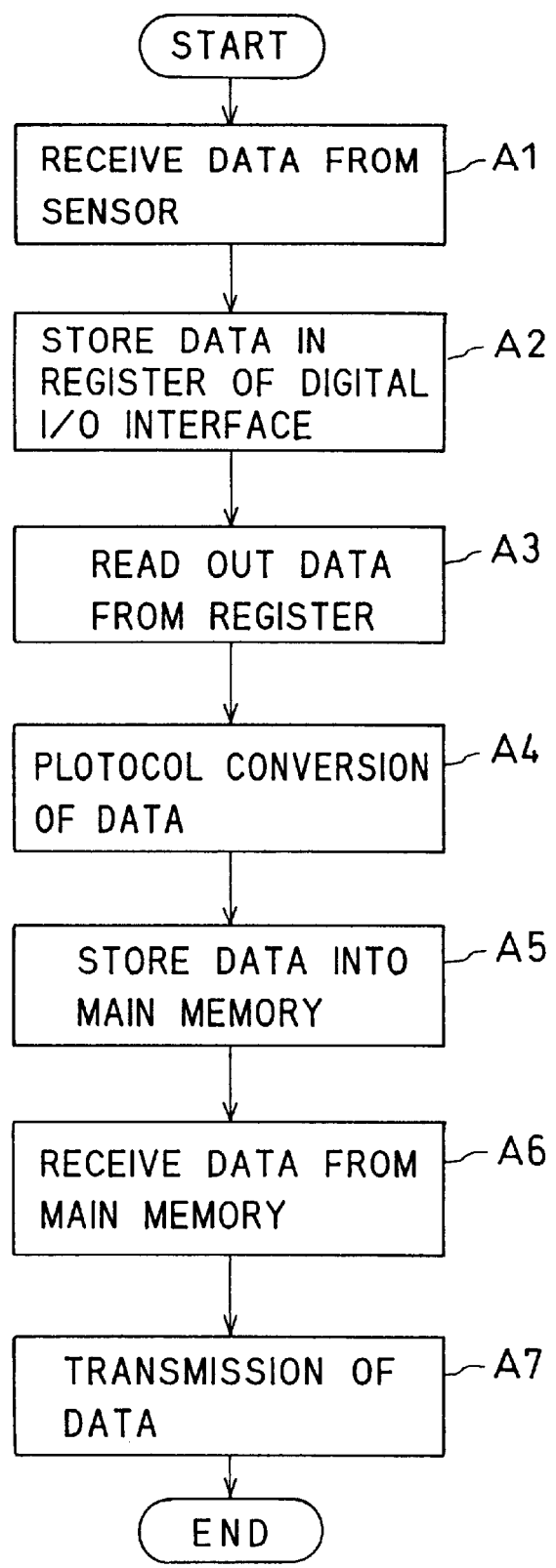
FIG. 4 is a flow chart of a data transfer operation from a sensor or actuator to an Ethernet, in accordance with methods and system provided.

With reference to the flow chart shown in FIG. 4, the data transfer processing operation to the Ethernet 106 from the sensor or actuator connected to the digital input/output interface 107 will be explained hereunder.

When data is sent to the digital input/output interface 107 from the sensor and received by the digital input/output interface 107 (Step A1), the data is fetched and stored by the register installed in the module of digital input/output interface 107 (Step A2).

By an interruption occurred due to data changes or polling, the CPU 101 reads the data stored in the register installed in the module of digital input/output interface 107 (Step A3) and converts the data to the protocol of the data transfer destination (Step A4). In this case, as the information system communication protocol to be supplied as an output is Ethernet, the data is converted to the Ethernet protocol and stored in the memory 102 (Step 5). The information system communication controller 105 is notified that the data sent is stored in the memory 102 and receives the data converted to the Ethernet protocol from the memory 102 via the bus controller 104 (Step A6).

Thereafter, the data is sent out via the Ethernet 106 (Step A7). When a communication protocol such as IrDA or ISDN is to be used, the network protocol of the information system communication controller 105 or the Ethernet 106 is replaced with the one corresponding to the communication protocol such as for IrDA or ISDN.

Figure 5:
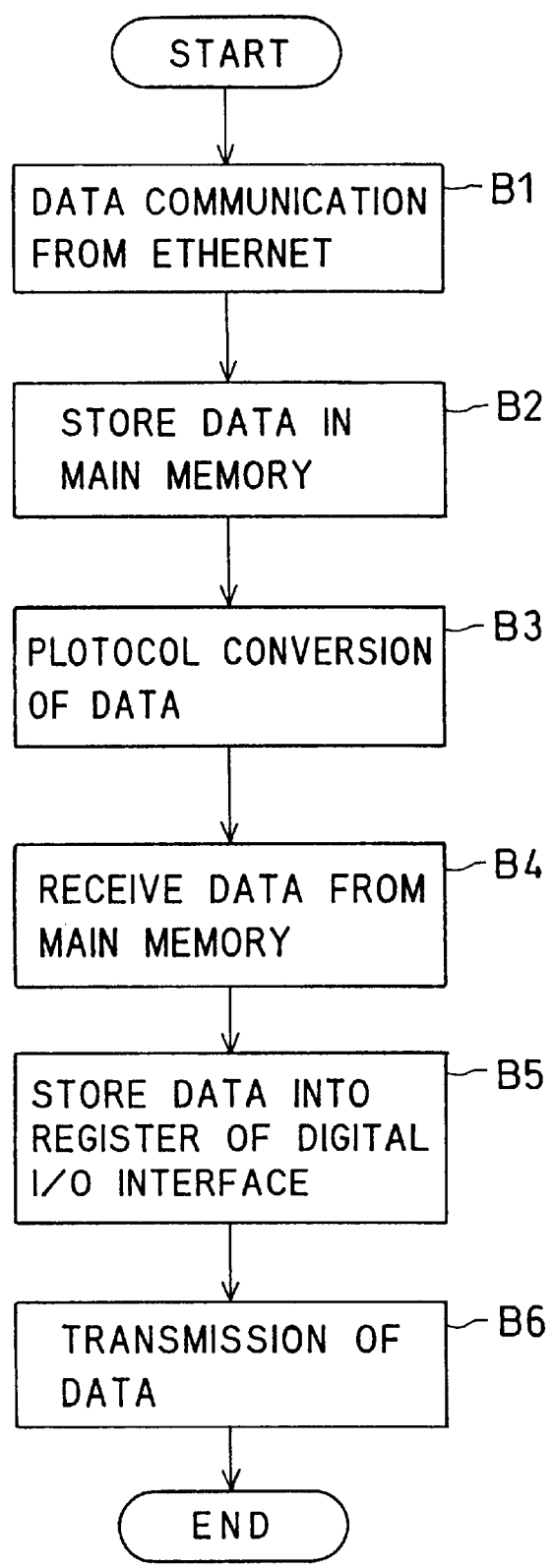
FIG. 5 is a flow chart of a data transfer operation from an Ethernet to a sensor or actuator, in accordance with methods and systems provided.

Next, data transfer to a sensor or actuator connected to the digital input/output interface 107 from the Ethernet 106 will be explained by referring to the flow chart shown in FIG. 5.

When data is sent;to the information system communication controller 105 from the Ethernet 106, the data is received by the information system communication controller 105 (Step B1). The information system communication controller 105 transfers the data to the memory 102 via the bus controller 104 (Step B2).

Then, the CPU 101 converts the protocol of the data to a protocol suited to the sensor or actuator connected to the digital input/output interface 107 (Step B3). The digital input/output interface 107 receives the data whose protocol is converted in the memory 102 (Step B4).

Next, the data whose protocol is converted is stored in the register of the digital input/output interface 107 (Step B5). The digital input/output interface 107 sends, the data stored in the register to the sensor or actuator connected to the control system data signal line 111 from the data signal line 111 (Step B6).

According to the embodiment described above, mutual communication can be readily realized between control system data from a sensor or an actuator and information system data from a communication network based on Ethernet or ISDN.

Second Embodiment

By referring to FIGS. 6 and 7, an example of a system using the aforementioned LSI in the first embodiment will be explained hereunder.

Figure 6:
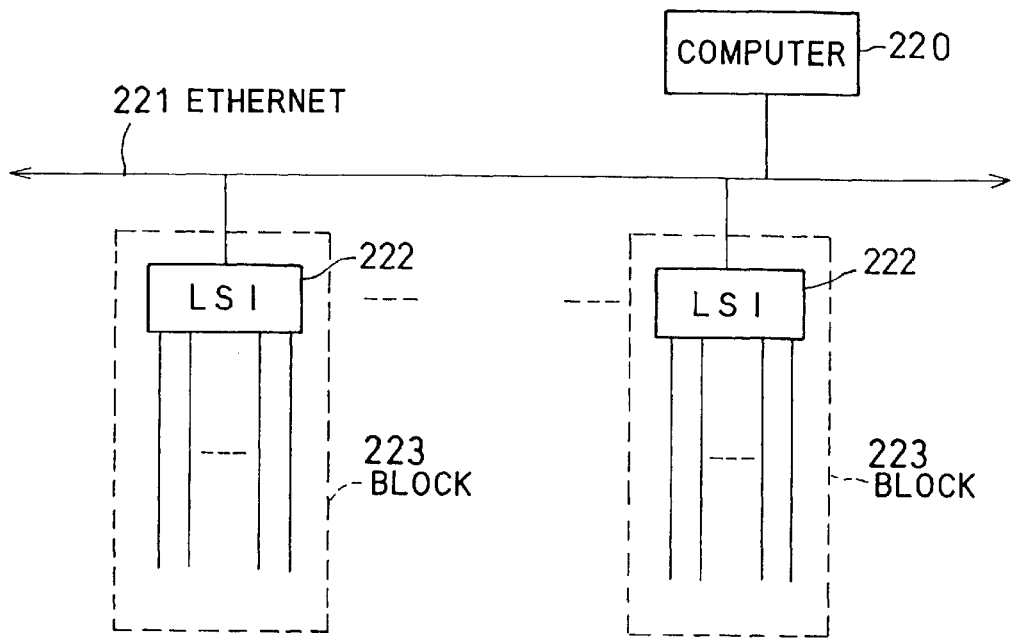
FIG. 6 is a block diagram of a plurality of LSIs and a computer connected to an Ethernet, in accordance with methods and systems provided.

FIG. 6 shows an example using Ethernet 221 as a communication protocol.

A plurality of LSIs 222 and a computer 220 are connected to the Ethernet 221. The computer 220 manages data from the plurality of LSIs 222 connected to the Ethernet 221 in a batch. LSIs 222 connected to the Ethernet 221 are LSIs having features and functions explained in detail in the first embodiment mentioned above.

A block 223 is a block including an LSI 222, a sensor or an actuator which is connected to LSI 222. Speaking of a factory, the block 223 is equivalent to a line of manufacturing. In other words, it is equivalent to one line in a factory or one building. Control system data of each block is supplied as an output to Ethernet 221 via LSI 222.

Computer 220 connected to Ethernet 221 can gather data delivered from a plurality of blocks and centrally manage them. Thus the system installed in each block can be made smaller an d simpler.

Sending and receiving of data by this system are similar to those in the first embodiment mentioned above in consideration of blocks 223 one by one. However, the data of each block is centrally managed by the computer 220.

Figure 7:
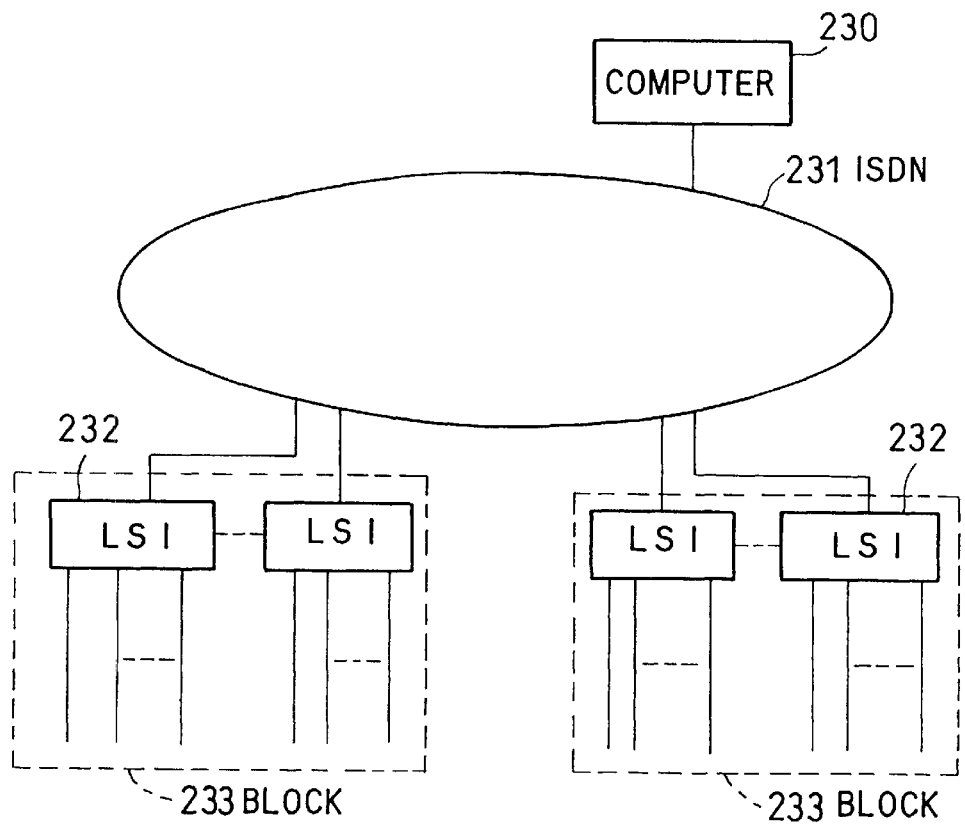
FIG. 7 is a block diagram of a plurality of LSIs and a computer connected to an ISDN, in accordance with methods and system provided.

FIG. 7 shows a case that an ISDN is used as a communication protocol. When an ISDN is used, a wide area network (WAN (wide area network)) can be used, so that control data at each factory can be controlled together by a computer 230 in the main office, assuming one block shown in FIG. 7 as a factory for example.

FIG. 7 shows an exemplary application using an ISDN as an information communication system network using LSIs 232.

The computer 230 manages data from the plurality of LSIs 232 connected to the ISDN in a batch. The plurality of LSIs 232 and the computer 230 are connected to the ISBN 231. The LSIs 232 are LSIs of the first embodiment mentioned above.

A block 233 is a block including an LSI 232, a sensor or an actuator which is connected to LSI 232. As an example, one factory having a plurality of lines can be considered.

With respect to sending and receiving of data by this system, a case that a plurality of such factories are gathered can be supposed, assuming the system shown in FIG. 6 as one factory. Therefore, sending and receiving of data are basically similar to those in the first embodiment mentioned above.

Third Embodiment

Figure 8:
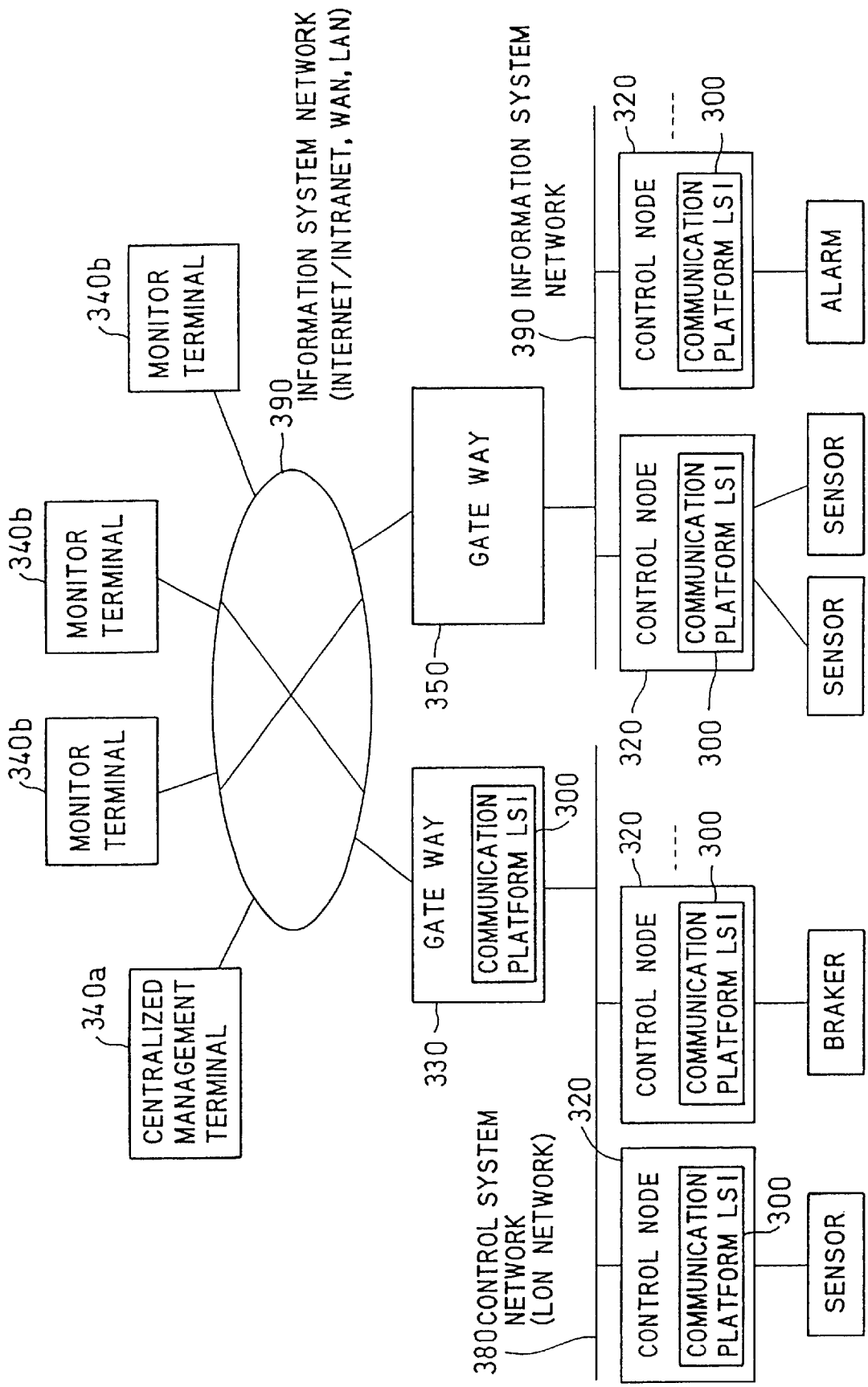
FIG. 8 is a block diagram of a network system, in accordance with methods and systems provided.
Figure 9:
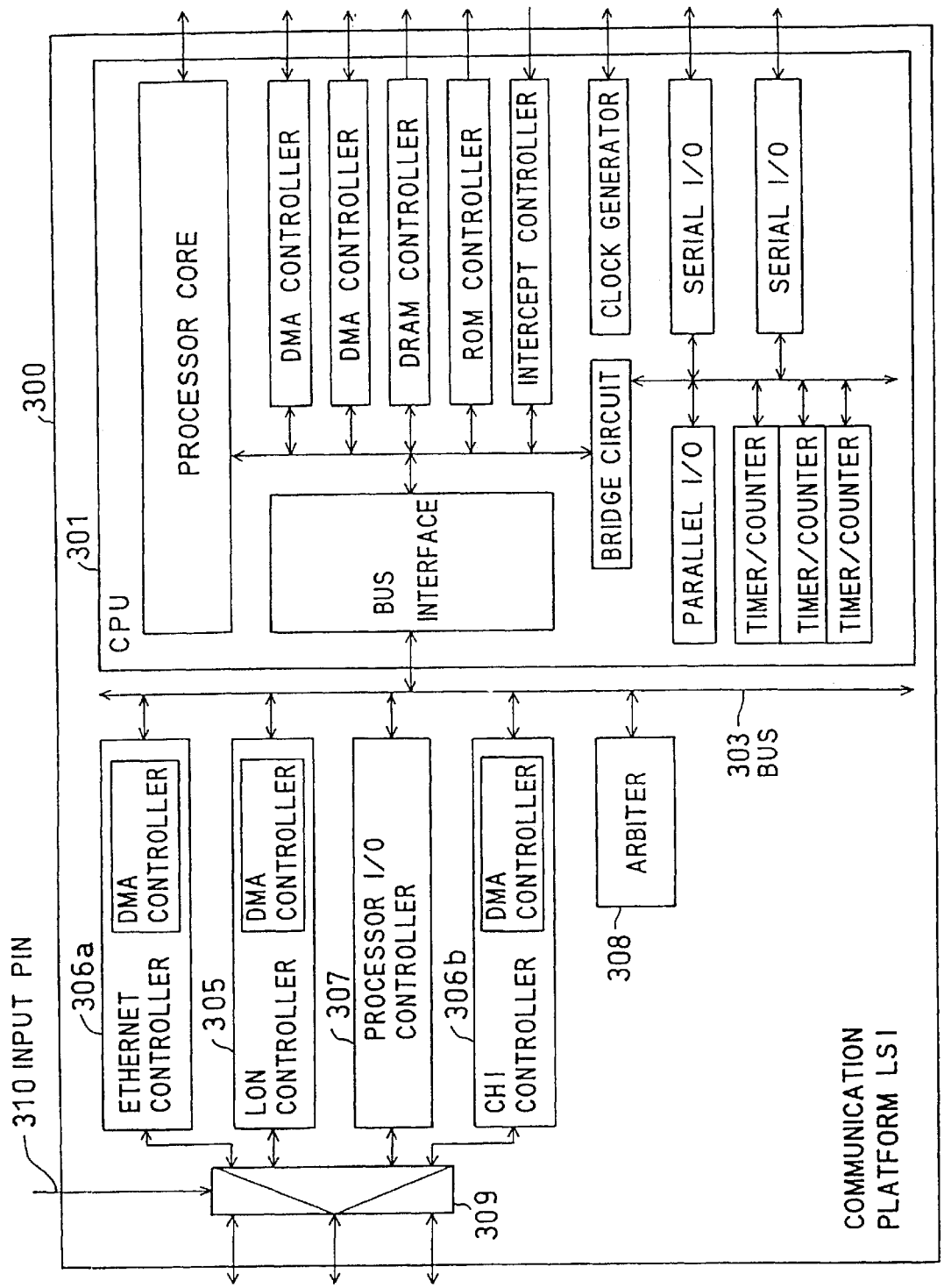
FIG. 9 is a block diagram of a communication platform LSI, in accordance with methods and systems provided.

The third embodiment of the present invention will be explained. In the third embodiment, as shown in FIG. 8, a communication platform can be applied not only to a gateway 330 for connecting a control system network 380 and an information system network 390 but also to control nodes 320 connected to the control system network 380 and the information system network 390 for executing monitoring and drive controlling of sensors or actuators. In FIG. 9, more detailed feature of the communication platform LSI 300 of the third embodiment is shown. A gateway 350 is a gateway having the function for connecting information system networks.

The communication platform LSI 300 is an electronic circuit which is applied to the gateway 330 for connecting the control system network 380 using a dedicated communication protocol 1 such as Lon Talk and an information system network using a standard protocol such as Ethernet. LSI 300 is also an electronic circuit which is applied to nodes 320 for executing monitoring and drive controlling of sensors or actuators. LSI 300 is, as shown in FIG. 9, a one-chip electronic circuit in which a CPU 301, an Ethernet controller 306a, a LON controller 305, a processor I/O controller 307, a CHI controller 306b, and an arbiter 308 are connected with each other via a bus 303.

The CPU 301 is used to process information for executing protocol conversion and device control by a DMA controller, a DRAM controller, a ROM controller, an intercept controller, a serial I/O controller, a parallel I/O controller, and a timer/counter included therein.

The Ethernet controller 306a is a communication controller for controlling sending and receiving of data via an external WAN controlled LSI. The LON controller 305 is a communication controller for controlling sending and receiving of data via the LON. The processor I/O controller 307 is a communication controller for executing monitoring and drive controlling of sensors and actuators. The CHI controller 306b is a communication controller for controlling of sending and receiving of data via the WAN. The arbiter 308 executes exclusive control for the CPU 301 and each communication controller (305, 306a, 306b, 307).

In the communication platform LSI 300, a switching device 309 is installed. The switching device 309 selects a communication controller which can effectively function from a plurality of communication controllers. More specifically, when it is applied to the gateway 330, the switching device 309 selects the Ethernet controller 306a (when the information system network 390 is an Ethernet network) and the LON controller 305 or either one of the CHI controller 306b (when the information system network 390 is a WAN) and the LON controller 305. When it is applied to the control nodes 320, the switching device 309 selects either one of the LON controller 305 and the processor I/O controller 307.

The switching device 309 selects a communication controller from a plurality of communication controllers which can effectively function on the basis of a signal supplied from an input pin 310 by switching an I/O sign al pin used by each communication controller (306s, 305, 307, 306b).

According to the third embodiment of the present invention, the communication platform LSI 300 can be commonly applied by the network devices (the gateway 330 and the control nodes 320).

Figure 10:
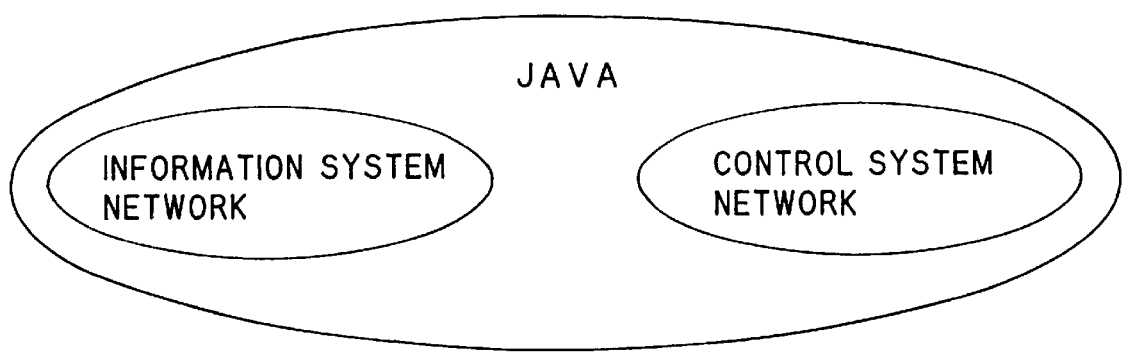
FIG. 10 is a conceptual diagram of a control system network and an information system network integrated on the software level, in accordance with methods and systems provided.

The program of the communication platform LSI 300 for allowing the CPU 301 to process information for protocol conversion and device control is generated by the same general purpose program language as the program operating the computer (a centralized management terminal 340a, a monitor terminal 340b, etc.) connected to the information system network 390, for example, Java. Thus as shown in FIG. 10, a control system network and an information system network can be integrated on the software level. Further, as shown in FIG. 8, central management terminal 340a, the monitor terminal 340b, the gateway 330, and the control nodes 320 can communicate with each other using the same procedure, seamlessily connecting from the central management terminal 340a, the monitor terminal 340b etc. to the control nodes at the end.

According to the present invention described, mutual communication of control system data and information system data can be easily realized. Furthermore, by incorporating various control system I/O interfaces, an ISDN controller and a modem controller for constructing Ethernet and WAN which can be easily handled by a computer and are suited to communication of a large amount of data at high-speed into one chip, a large scale network or a wide area network with a control system and an information system merged can be easily realized even in a small system. Thus, central management of information controlling a plurality of factories or information managing a building can be easily realized in a batch at low cost can be produced.

What is claimed is:

1. A communication platform system comprising;
   a first information system network using a first protocol selected from the set of Ethernet and ISDN;
   a control system network using a second protocol;
   a first network connection unit for connecting said first information system network with said control system network;
   a second network connection unit for connecting said information system network with a second information system network;
   one or more control units connected to said control system network, and one or more control units connected to said second information system network, each of said control units for controlling one or more sensors and/or actuators;
   one or more monitor terminals connected to said first information system network and to one or more of said control units;

a central management terminal connected to said first information system network and to said control units for monitoring and controlling all the sensors and/or actuators;

wherein said first network connection unit and the one or more control units are each provided with a communication platform for exchanging information between said first information systems network and said sensors and/or actuators, and wherein said communication platform comprises:

a storage unit for storing information system data in said first protocol and control system data in said second protocol, an information system data communication control unit for controlling the sending and receiving of data to and from said first information systems network, a control system data interface unit for controlling the sending and receiving of data in said second protocol to and from one or more sensors and/or actuators;

a unit for reading and writing data sent and received by said information system data communication control unit and by said control system data interface means into said storage unit;

a conversion unit for converting the protocol of said data sent and received to data having a protocol suited to the protocol of the sending destination;

wherein, said protocol conversion unit stores information system data received by said information system data communication control unit in said storage means when sending said information system data received from said information system network to a sensor, or actuator, converts said stored information system data from said first protocol to said second protocol, storess sadi protocol-converted data in said storage unit, and said control system data interface unit sends said protocol-converted data in said storage unit to said sensor, or actuator; and wherein, said protocol conversion unit stores said control system data received by said control system data interface unit in said storage unit when sending said received control system to said first information system network, converts said stored control system data from said second protocol to said first protocol, stores said protocol-converted data in said storage unit, and said information system data communication control unit sends said protocol-converted data in said storage unit to said first information system network; and wherein said sensors and/or actuators are controlled by said one or more monitor terminals or said centralized management terminal.

2. A communication platform system according to claim 1, wherein said system manages an optional number of said communication platforms as a block.

* * * * *